United States Patent [19]

Crosby et al.

[11] 4,323,365

[45] Apr. 6, 1982

[54] DEWATERING OF SOLID RESIDUES OF CARBONACEOUS MATERIALS

[75] Inventors: Alan C. Crosby, Tustin; David C. Campen, Arcadia, both of Calif.

[73] Assignee: Occidental Research Corporation, Irvine, Calif.

[21] Appl. No.: 172,736

[22] Filed: Jul. 28, 1980

Related U.S. Application Data

[63] Continuation of Ser. No. 171,873, Jul. 24, 1980, which is a continuation of Ser. No. 941,772, Sep. 13, 1978, abandoned.

[51] Int. Cl.$^3$ .............................................. C22B 1/14
[52] U.S. Cl. .................................... 23/313 R; 209/5; 210/710; 210/725; 210/727; 210/770; 75/3
[58] Field of Search ................. 23/313 R, 314; 44/23, 44/24; 75/3; 209/5, 49; 210/634, 702, 710, 711, 724–729, 737, 768, 770, 771; 423/460, 461

[56] References Cited

U.S. PATENT DOCUMENTS

| | | | |
|---|---|---|---|
| 1,562,876 | 11/1925 | Edser et al. | 210/702 |
| 3,042,504 | 7/1962 | Carter | 423/461 |
| 3,148,140 | 9/1964 | Kaiser et al. | 423/461 |
| 3,210,170 | 10/1965 | Spijker et al. | 210/734 |
| 3,268,071 | 8/1966 | Puddington et al. | 209/5 |
| 3,349,029 | 10/1967 | Cheng | 210/727 |
| 3,694,355 | 9/1972 | Visser et al. | 210/634 |
| 3,844,811 | 10/1974 | Brynko | 23/314 |
| 3,917,569 | 11/1975 | Richter et al. | 48/197 R |
| 4,003,737 | 1/1977 | Caswell et al. | 209/5 |
| 4,277,252 | 7/1981 | Dudt | 209/5 |

FOREIGN PATENT DOCUMENTS

| | | | |
|---|---|---|---|
| 45-17283 | 6/1970 | Japan | 423/461 |
| 834940 | 5/1960 | United Kingdom | 210/727 |
| 1351986 | 5/1974 | United Kingdom | 210/609 |

OTHER PUBLICATIONS

*The Condensed Chemical Dictionary*, 8th Edition, Von Nostrand Reinhold Company, 1971, p. 513.

*Primary Examiner*—Peter A. Hruskoci
*Attorney, Agent, or Firm*—Max Geldin; Forrest E. Logan

[57] ABSTRACT

Process for removal of water from a mixture of water and certain solid residues of carbonaceous material, such as a coal char-water slurry, which comprises mixing the slurry with an acid, preferably hydrochloric acid, a surfactant, preferably water-immiscible such as lecithin, and an organic compound such as a liquid hydrocarbon, e.g. mineral spirits, causing the char to agglomerate, and thereby facilitating separation of the char from the mixture, as by screening, and filtering or centrifuging.

34 Claims, No Drawings

DEWATERING OF SOLID RESIDUES OF CARBONACEOUS MATERIALS

This application is a continuation of Ser. No. 171,873 filed July 24, 1980, which was a continuation of Ser. No. 941,772 filed Sept. 13, 1978, now abandoned.

BACKGROUND OF THE INVENTION

This invention relates to the removal of water from a mixture of water and certain solid residues of carbonaceous material, such as coal char, and is particularly concerned with an efficient and relatively simple process for agglomerating the particles of such solid residues, particularly coal char, in a char-water slurry, and further processing the resulting mixture to remove the agglomerated carbonaceous solids or char, to obtain a carbonaceous solids or char product of substantially reduced water content.

The agglomeration of bituminous coal by use of hydrocarbons has been demonstrated, as described in Perrott, G. St. J., and Kinney, S. P., "Laboratory Studies of the Trent Process," USBM No. 2263, July, 1921; and Fraser, T., "Convertol Process of Coal-Slurry Treatment," USBM No. I.C. 7660, April, 1953. Dewatering of a coal-water slurry by the use of surfactants has also been reported in Silverblatt, C. E. and Dahlstrom, D. A., "Moisture Content of a Fine-Coal Filter Cake," Industrial and Engineering Chemistry, June, 1954; Venkatesan, S., "Research Imperative to Improve Thermal Drying," Coal Mining and Processing, September, 1975; and Baker, A. F., "Hot Surfactant Solution as a Dewatering Aid During Filtration," NCA/BCR Coal Conference and Expo III, Louisville, Ky., October, 1976. However, these applications have been limited to a neutral water-slurry system.

U.S. Pat. No. 3,349,029 discloses a process for removing carbon particles from quench water by first treating the carbon particles with a surfactant capable of rendering the particles hydrophobic, contacting the particles with a liquid hydrocarbon to transform the carbon particles to larger units such as balls, and separating such larger carbon units from the aqueous medium by suitable means such as filtration. Processing temperatures disclosed are at 160° F. to 180° F. The quench water is apparently substantially neutral. U.S. Pat. No. 3,717,574 discloses addition of an acid such as sulfuric to a normally alkaline colloidal coal slurry and thereafter flocculating the slurry by addition of polyacrylamides and similar agents. The reaction pH is just on the acid side, about 6.5.

U.S. Pat. Nos. 3,268,071; 3,661,254; 4,003,737 and Sirianni et al., Recent Experience with the Spherical Agglomeration Process, Can. J. Chem. Engr., Vol, 47, pp. 166-170, April, 1969, all deal with the Canadian spherical agglomeration process, employing hydrocarbons and which is applicable to a wide variety of material separations including coal and graphite. The 3,661,254 patent discloses agglomeration at both high and low pH using a combination of materials such as sodium oleate and crude oil.

U.S. Pat. Nos. 2,903,423; 3,210,170 and 3,694,355 relate to an agglomeration process applicable to carbon-water and coal-water slurries, employing hydrocarbons.

U.S. Pat. Nos. 3,462,262 and 3,917,569 are also illustrative of technique for separating carbon from a water-carbon slurry, e.g. by hydrocarbon addition.

However, certain particulate residues of carbonaceous substances, such as coal char, cannot be agglomerated effectively from an aqueous neutral slurry thereof by addition of hydrocarbon or surfactant, separately, or in combination.

It is an object of the present invention to remove water from aqueous mixtures containing particulate carbonaceous solids. A further object is the provision of effective procedure to facilitate the removal of water in mixtures of water and certain solid residue particles of carbonaceous material, particularly coal char, by agglomeration of such particles and the displacement of the water from the agglomerate through the use of an immiscible liquid. Yet another object is to provide procedure of the above type whereby following agglomeration of the residue solids, e.g. coal char, particles, and displacement of water from the agglomerated particles, the water content of such particles, after screening, can be substantially reduced by techniques including filtering and/or centrifuging.

SUMMARY OF THE INVENTION

It has been found that by incorporating a suitable surfactant, preferably a water immiscible surfactant, together with a hydrocarbon or related organic compound as hereinafter defined, and which is preferably miscible with the surfactant, in an aqueous acid solution of certain solid carbonaceous materials, especially particulate residues of carbonaceous substances, particularly an acid-coal char slurry, such solids or coal char can be readily agglomerated, and the agglomerated particles removed, as by screening, filtering and the like, to provide a carbonaceous solids or coal char product of substantially reduced water content. Thus, according to the invention, when an aqueous HCl slurry of coal char, for example is treated with a surfactant, such as lecithin, in conjunction with a hydrocarbon such as mineral spirits, agglomeration of the coal char occurs, by displacement of water from the agglomerating particles, greatly reducing the water retention of the char, and permitting water removal by screening and filtering the so-treated acid slurry, to obtain a coal char having a substantially reduced water content of between about 15% and 18%, by weight. This is in contrast to obtaining char, e.g. containing 47% by weight of water, by filtering an aqueous acid slurry of the same char in the absence of treatment with surfactant and hydrocarbon according to the invention.

It will be understood that the use of the word "water" when referring to removal thereof from the slurry of carbonaceous materials, or from the resulting agglomerated solids, refers also to removal of acid together with such water.

The carbonaceous residue solids or coal char, is slurried with an aqueous acid solution, e.g. a 20% HCl solution, preferably at elevated temperature e.g. at 80° C., for a relatively short period of time. Various acids other than HCl can be used such as phosphoric acid, acetic acid, and the like. Ambient or room temperatures can be employed instead of elevated temperatures.

A suitable surfactant is then added to the aqueous acid slurry of carbonaceous residue particles or coal char. Such surfactant preferably is immiscible in aqueous acid solution, and can be a nonionic, amphoteric or cationic surfactant, an illustrative surfactant for this purpose being the water immiscible amphoteric surfactant, lecithin.

A liquid hydrocarbon or related organic compound is added in conjunction with the surfactant. Such additive is immiscible or substantially immiscible in aqueous acid solution, but is miscible with the surfactant. For this purpose, non-halogenated liquid hydrocarbons such as pentane, hexane, and the like can be employed, and also liquid chlorinated hydrocarbons such as methylene chloride. Other liquid hydrocarbons which can be employed are petroleum fractions, both distillates such as fuel oil #2 and distillate residues such as fuel oil #6. Also, liquid aliphatic alcohols such as n-pentanol can be employed in place of hydrocarbons or chlorinated hydrocarbons.

The order of addition of the surfactant and liquid hydrocarbon or related compound, to the acid carbonaceous residue solids, e.g. coal char, slurry, is immaterial and either the surfactant, or the hydrocarbon or related compound can be added first, or both can be added to the acid slurry together.

Upon addition of the surfactant and liquid hydrocarbon or related compound, to the acid slurry of carbonaceous residue solids such as coal char, rapid agglomeration of the solid particles occurs. After such agglomeration, the carbonaceous residue solids or char can be screened and the screened char then filtered or centrifuged. Prior to such filtering or centrifuging, the char can be washed, e.g. to remove excess acid. It is preferable to remove as much acid as possible from the agglomerated solids, as for example by filtering or centrifuging, such latter steps also removing some additional water. The resulting agglomerated solids are dried and the hydrocarbon or related organic compound removed during drying is recovered.

Thus, according to the invention, there is provided a process for the removal of water from an aqueous slurry of a carbonaceous material, preferably a solid particulate residue of a carbonaceous material, selected from the group consisting of coal char and coke breeze, which comprises forming a mixture of said slurry, an acid, a surfactant, preferably a water immiscible surfactant, and an organic material selected from the group consisting of liquid hydrocarbons, liquid chlorinated hydrocarbons and low molecular weight liquid aliphatic alcohols, said organic material being immiscible in the aqueous acid but miscible with said surfactant, causing agglomeration of said particulate solid residue and displacement of water therefrom, and removing said agglomerated solids having reduced water content, wherein said agglomeration will not occur, or will occur to a significantly lower degree if any one of said acid, said surfactant, or said organic material is absent from said mixture.

DETAILED DESCRIPTION OF THE INVENTION AND PREFERRED EMBODIMENTS

The solid carbonaceous material treated according to the invention is preferably a solid particulate residue of a carbonaceous material including coal char, which is essentially bituminous coal char, and coke breeze, the latter being coke of less than about ½" particle size. The invention process has particular applicability to the above specific coal char and coke breeze, such carbonaceous residue solids in both cases preferably having a relatively small particle size ranging from less than about 60 mesh (0.0097") to less than about 400 mesh (0.0015"), the majority of the particles being of a size ranging from less than 60 mesh to less than 200 mesh (0.0029").

Such particulate solids are mixed with water to form an aqueous acid slurry. In the case of coal char slurries, an aqueous acid slurry such as an aqueous HCl slurry, can be provided initially for the purpose of removing sulfide sulfur from the char, usually by heating at elevated temperature.

Where acid is not already present in the aqueous slurry of carbonaceous residue solids, according to the present invention for agglomeration of such solids, an acid such as hydrochloric, phosphoric, nitric, sulfuric, acetic acid, and the like, is added to the aqueous slurry of the particulate carbonaceous material. Preferably, a strong acid is employed, most desirably HCl. The concentration of the acid in the aqueous acid, e.g. aqueous hydrochloric acid, of the slurry of carbonaceous solids can range from about 1 to about 35% by weight. The concentration or amount of acid in the solids, e.g. coal char, slurry is such that the slurry is well on the acid side, and having a pH usually below 1.

The amount of carbonaceous residue solids, e.g. coal char, present in the aqueous acid slurry can vary widely, forming dilute or thick slurries, and can range from about 2% to about 35%, by weight of such slurry. Particularly where the acid slurry contains coal char which includes sulfide sulfur, the aqueous acid, e.g. HCl, slurry is heated at elevated temperature ranging from about 60° to about 100° C. and for a period of time, e.g. about 5 to about 10 minutes, to react with and leach out the sulfide sulfur from the char. The reaction is facilitated by agitating the aqueous acid slurry. However, where the carbonaceous residue solids, e.g. coal char, do not contain any sulfide sulfur, such heating step can be omitted and treatment of the aqueous carbonaceous solids according to the invention can be carried out entirely at ambient temperature.

The preferably water immiscible surfactant which is added to the aqueous acid slurry of carbonaceous residue solids can be a wide variety of surfactants, including the classes of nonionic, amphoteric and cationic surfactants. Examples of nonionic surfactants are alkoxylated alkyl phenols, such as ethoxylated nonylphenol, of which the material marketed as "Tergitol NP-14" is representative; high molecular weight fatty alcohol polyglycol ethers such as the material marketed as "Alkanol OR"; polyethylene glycol monostearate, marketed as "Varonic 400 MS"; and ethoxylated soya amines, such as the material marketed as "Varonic L202"; and certain oxyalkylated alcohols, such as the polyethoxylated secondary alcohols of $C_{11}$ to $C_{15}$ carbon chains, as represented by the material marketed as "Tergitol 15-S-3," which are mixtures of such alcohols containing an average of about 3 ethylene oxide groups per mole.

Examples of amphoteric surfactants include lecithin; cocohydroxyethyl imidazoline, marketed as "Varine C"; and coco-amido betaine, marketed as "Varion CADG".

Examples of cationic surfactants which can be employed in the invention process include the aliphatic quaternary ammonium chlorides, such as tricapryl methyl ammonium chloride, marketed as "Aliquat 336"; dimethyl dipalmityl ammonium chloride, marketed as "Aliquat 206"; dimethyl dimyristyl ammonium chloride, marketed as "Aliquat 205"; and dimethyl tall oil ammonium chloride, marketed as "Aliquat 215".

The above preferred surfactants employed according to the invention and illustrated above are water immiscible. However, water miscible surfactants also can be employed.

Examples of nonionic surfactants which are water miscible are certain oxyalkylated alcohols such as the polyethyoxylated secondary alcohols of $C_{11}$–$C_{15}$ carbon chains and containing 5 to 9 ethylene oxide groups per mole, of which the materials marketed as Tergitol 15-S-5, 15-S-7, 15-S-9, which are each mixtures of such alcohols containing an average of 5, 7 and 9 ethylene oxide groups per mole, respectively, are representative; and high molecular weight fatty alcohol polyglycol ethers, of which the materials marketed as "Alkanol OJ" and "Alkanol OP" are representative.

Examples of cationic surfactants which are water miscible and which may be incorporated into the invention process include the aliphatic quaternary ammonium chlorides, such as trimethyl oleyl ammonium chloride, marketed as "Aliquat 11"; trimethyl tallow ammonium chloride marketed as "Aliquat 26"; and N-coco N,N-dimethyl N', N', N'-trimethyl 1, 3-propylene diammonium chloride, marketed as "Aliquat 721." Examples of amphoteric surfactants which are water miscible are Varion 1017, a coco amino sulfonate, and Varion 1084, a tallow amino sulfonate.

The concentration of surfactant can range from about 0.1 to about 5%, preferably about 0.1 to about 2%, by weight of the carbonaceous residue solids or char.

A group of preferred surfactants includes lecithin, tricapryl methyl ammonium chloride and the above-noted polyethoxylated secondary alcohols of $C_{11}$ to $C_{15}$ carbon chains, and mixtures of such alcohols. Such surfactants are preferred because best results with respect to water removal from the carbonaceous or residue solids, e.g. coal char-water slurry, are thus obtained.

As previously noted, a liquid hydrocarbon or related liquid compound is added to the aqueous acid slurry of carbonaceous solids such as aqueous HCl coal char slurry, in conjunction with the above described surfactant. The liquid hydrocarbon or related compound must be liquid when slurried with the solid material. The liquid hydrocarbon or related compound generally is miscible with the surfactant, and immiscible in the aqueous acid slurry. Examples of liquid hydrocarbons which can be employed include aliphatic hydrocarbons e.g. containing about 5 to about 12 carbon atoms, such as mineral spirits, pentane, hexane, and mixtures of such hydrocarbons. Other suitable liquid hydrocarbons include petroleum fractions, both distillates such as fuel oil #2 and distillate residues such as fuel oil #6. Aromatic liquid hydrocarbons also can be employed such as those containing from about 6 to about 10 carbon atoms, e.g. benzene, toluene, xylenes, and mixtures thereof. There can also be employed liquid chlorinated hydrocarbons, e.g. containing about 1 to about 12 carbon atoms, such as methylene chloride, carbon tetrachloride, 1-chlorobutane, and the like. Low molecular weight liquid aliphatic alcohols containing from about 5 to about 10 carbon atoms also can be employed such as n-pentanol, n-hexyl alcohol, n-octyl alcohol, and the like. A group of preferred liquid hydrocarbons or related liquid organic compounds includes mineral spirits, methylene chloride and pentane.

The amount of hydrocarbon or related compound which can be employed can range from about 10 to about 75%, preferably about 20 to about 70%, and most desirably about 60 to about 70%, by weight of the carbonaceous residue solids, e.g. coal char. Representative combinations of surfactant and hydrocarbons which can be employed are lecithin with mineral spirits, tricapryl methyl ammonium chloride with methylene chloride or pentane, lecithin with methylene chloride, and an oxyethylated alcohol such as Tergitol 15-S-3 with methylene chloride.

The surfactant can be added to the acid slurry first, followed by addition of the hydrocarbon or related compound, or vice versa, or both the surfactant and hydrocarbon can be added together to the acid slurry of the carbonaceous solids. Alternatively, the acid, surfactant and hydrocarbon or related compound can be added together to the aqueous slurry of carbonaceous solids.

Agglomeration of the carbonaceous residue solids, e.g. coal char, occurs almost immediately after adding both the surfactant and hydrocarbon or related compound to the carbonaceous solids slurry. Temperature of such slurry during treatment according to the invention can range from ambient temperature up to about 100° C.

The resulting acid slurry containing agglomerated solids preferably is then screened, using a coarse screen such as a 30 mesh screen, to recover agglomerated solids having substantially reduced water content. As result of the ability to agglomerate the carbonaceous solids, e.g. coal char, by the above noted procedure, the water retention of the carbonaceous solids is greatly reduced, permitting a high degree of water removal by a fast, inexpensive, and easy screening of the solids on a coarse screen as noted above. Thus, as pointed out hereinafter, water levels as low as 15.9% in the carbonaceous solids, e.g. coal char, can be obtained by screening. Subsequent filtration or centrifuging removes any excess hydrocarbon and some additional water in the solids. Prior to screening and/or filtering, the agglomerated solids can be washed, e.g. to remove excess acid. Following screening and/or filtration, the agglomerated solids are dried, e.g. in an oven at about 100° C.

In order to render the invention process more economical, the liquid hydrocarbon or related liquid organic compound is recovered during the drying process. During the drying step, at suitably elevated temperature, the hydrocarbon and water are driven off together, and the two immiscible liquids are then separated by conventional means, as by condensing the two liquids, and employing a separatory funnel to separate out the water from the immiscible hydrocarbon. Alternatively, distillation type procedure can be implemented during the drying procedure with the lower boiling liquid collected first and the other liquid collected later.

The following are examples of practice of the invention.

EXAMPLE 1

300 grams of coal char, of which 76% consisted of −100 mesh size particles, was stirred into 600 mls of 20% HCl which had been heated to 80° C., and the mixture allowed to react for 10 minutes. The sample was then mixed at 1500 rpm and 0.2% lecithin, by weight of the char, was added along with varying amounts of mineral spirits (Amsco solvent G) in a series of runs, as noted in the Table below.

In each run agglomeration occured almost immediately. The agglomerated char was screened out on a 30 mesh sieve, and a sample was removed for analysis. The remaining char was suction filtered and an additional sample removed for anaylsis. Moisture content was determined for each sample by Dean-Stark distillation, according to ASTM methods D500-55 (Reapproved 1970) and D803-65 (Reapproved 1970), modified essentially by use of toluene instead of xylene. Heating of the toluene was accomplished by a spherical heating mantle provided with a variable power transformer. The sample of agglomerated char was added to the toluene and the sample heated until the toluene began to reflux and water was collected in the trap. Heating at this temperature was continued until the water level in the trap appeared to be at a constant level. The rate of distillation was then increased to remove all traces of condensed water in the condenser and distillation continued until the water level in the trap remained unchanged.

Hydrocarbon content was determined by drying the agglomerate at 110° C. under nitrogen until all water and mineral spirits were removed. The difference of char and water weights from the total weight was determined to be the hydrocarbon weight. Filtering of the char to remove water also removed excess hydrocarbon. The data for these runs are set forth in the table below, the results for each run being adjusted to a basis of 100 grams of char in the sample.

EXAMPLE 3

The procedure of Example 2 was carried out employing in place of the combination of mineral spirits and lecithin, 70 ml of methylene chloride per 100 grams char, and 0.2% tricaprylmethyl ammonium chloride by weight of char.

The use of tricaprylmethyl ammonium chloride with methylene chloride gave a 15.2% water content in the screened sample and a 15.8% water content in the filtered sample. This increase in the water content in the filtered sample results from the removal of only a small amount of water and all the excess methylene chloride present in the agglomerated sample.

EXAMPLE 4

The procedure of Example 2 was carried out employing in place of the combination of mineral spirits and lecithin, 70 ml of hydrocarbon per 100 grams char and 0.2% of surfactant by weight of char, of the various combinations of hydrocarbon and surfactant noted below.

(1) tricaprylmethyl ammonium chloride with pentane.
(2) Tergitol 15-S-3, with methylene chloride, and
(3) lecithin with fuel oil #2.

In all three cases, agglomeration of the coal char

TABLE

| ml Hydrocarbon[1] per 100 gms char | Screened Sample (gms) | | | Filtered Sample (gms) | | | Water content in the char - % by weight after | |
|---|---|---|---|---|---|---|---|---|
| | Char Wt. | Hydrocarbon Wt. | Water Wt.[2] | Char Wt. | Hydrocarbon Wt. | Water Wt.[2] | Screening | Filtering |
| 0[3] | — | — | — | 100.0 | 0 | 87.9 | — | 46.8 |
| 20 | 100.0 | 18.4 | 108.9 | 100.0 | 18.4 | 35.7 | 47.9 | 23.2 |
| 30 | 100.0 | 27.7 | 111.5 | 100.0 | 27.7 | 43.3 | 46.6 | 25.3 |
| 40 | 100.0 | 36.8 | 69.8 | 100.0 | 36.8 | 33.3 | 33.8 | 19.6 |
| 50 | 100.0 | 46.1 | 59.7 | 100.0 | 40.5 | 29.0 | 29.0 | 17.5 |
| 60 | 100.0 | 55.3 | 36.7 | 100.0 | 29.8 | 30.7 | 19.1 | 19.1 |
| 70 | 100.0 | 64.6 | 31.1 | 100.0 | 26.4 | 30.5 | 15.9 | 19.4 |
| 100 | 100.0 | 93.0 | 75.4 | 100.0 | 23.1 | 32.9 | 34.0 | 21.1 |

[1]Mineral spirits having a specific gravity of 0.895
[2]Water refers to a 20% HCl solution
[3]20% HCl with no hydrocarbon or surfactant From the table above, it is seen that the moisture content of the char can reach as low as 15.9% by weight after screening, in the run employing 70 ml of hydrocarbon (mineral spirits). Further water removal by filtration of the screened material removes any excess hydrocarbon and water and results in water levels as low as 17.5%, as shown in the 50 ml hydrocarbon run in the above table.

The screened samples of the table show that there is a decrease in moisture content of the agglomerated char, with increasing amounts of mineral spirits employed, particularly in those runs employing in excess of 40 and up to 70 ml mineral spirits, per 100 grams of char, and the mineral spirits remain with the char through screening and such excess of mineral spirits is eliminated upon filtration of the agglomerated char.

EXAMPLE 2

The procedure of Example 1 was carried out for a single run, employing 0.5% lecithin by weight of char and 60 ml mineral spirits per 100 grams char.

Agglomeration occured as noted in Example 1, and upon screening, the agglomerated char had a reduced moisture content of 14.6%, and after filtering to remove excess hydrocarbon and acid, the resulting filtered char product had a moisture content of 18.9%.

occurred, indicating a substantial reduction in water content of the resulting agglomerated char.

EXAMPLE 5

The procedure of Example 1 was carried out for a run employing 83.33 grams of coal char per 250 ml of 20% HCl solution heated to 80° C., 2% lecithin by weight of the char, and mineral spirits as the hydrocarbon in a concentration of 26.9 grams per 100 grams of char.

Agglomeration of the char particles occurred, and after screening, the agglomerated char had a water content of 35.1% by weight; after filtering, the water content of the char was reduced to 17.6%, by weight.

EXAMPLE 6

The procedure of Example 5 was followed, except that the aqueous HCl coal char slurry was maintained at ambient temperature of about 21° C.

Agglomeration of the char particles occurred, and after screening, the agglomerated char had a water content of 37% by weight; after filtering, the water content of the char was reduced to 19%, by weight.

This example in comparison with Example 5 shows that improved dewatering of the agglomerated coal char is obtained at elevated temperature of the acid-char slurry.

EXAMPLE 7

The procedure of Example 5 was carried out except that a more dilute aqueous HCl-char slurry was used, employing 8.33 gms. of coal char, 250 ml of 20% HCl solution, 2% lecithin by weight of char and 2.24 grams mineral spirits per 100 grams of char.

Agglomeration of the char particles occurred and the screened and filtered samples had substantially reduced water content.

Here no water determination was conducted due to the small sample size. This run was conducted primarily for the purpose of determining if agglomeration could be achieved in a very dilute system with the char greatly dispersed throughout the acid liquor. By the fact that the sample was agglomerated and screening was achieved indicates that a substantial water reduction was achieved. A small but further reduction in the water content was noted upon filtering of the sample.

EXAMPLE 8

The procedure of Example 5 was repeated except employing a neutral water slurry of the char.

Agglomeration of the coal char occurred, but after screening and after filtering respectively, the resulting coal char had substantially higher water contents than the 35.1% and 17.6% of the coal char in Example 5.

EXAMPLE 9

The procedure of Example 5 was repeated for a run employing 20% acetic acid and 0.2% lecithin by weight of the char.

Agglomeration of the chart particles occurred, and after screening, the agglomerated char had a water content of 31.6% by weight, and after filtering, the water content of the char was reduced to 17.6%, by weight.

EXAMPLE 10

The procedure of Example 5 was followed but employing as surfactant 1% of the water miscible surfactant Aliquat 26, noted above, by weight of the char.

Agglomeration of the char particles occurred, and after screening, the agglomerated char had a water content of 47.0% by weight, and after filtering, the water content of the char was reduced to 15.6%, by weight.

EXAMPLE 11

83.33 grams of coke breeze having a particle size of less than 60 mesh, was mixed with 250 ml of 20% HCl solution at 80° C. for five minutes. The resulting slurry was then agitated at 1500 rpm. To this slurry was added 25 ml mineral spirits. Agglomeration of the coke breeze particles occurred, with mixing continued for about two minutes.

The samples were then screened on a 30 mesh screen and allowed to drain. A screened sample was taken for Dean-Stark analysis and another portion was removed and filtered under vacuum and a filtered sample also was analyzed by the Dean-Stark procedure for moisture content.

The screened sample had a water content of 29.7%, and the filtered sample had a water content of 19.5%, by weight.

EXAMPLE 12

The procedure of Example 11 was repeated except that no mineral spirits were added. No agglomeration occurred.

The HCl thus could not be removed by decanting or screening but had to be filtered out.

The Dean-Stark analysis was run only on the filtered sample, which showed a water content of 25.0% by weight.

EXAMPLE 13

The procedure of Example 11 was followed, except that 0.2% lecithin by weight of coke breeze was added to the acid-coke breeze slurry together with the mineral spirits.

Agglomeration thereafter was achieved and screened and filtered samples were obtained.

The Dean-Stark analysis of the screened sample showed a water content of 27.5%, and the Dean-Stark analysis of the filtered sample a water content of 15.9% thereof, by weight.

It is seen that in Example 13, wherein lecithin, mineral spirits and acid were used, the filtered sample contained only 15.9% by weight of water, showing a substantial improvement over the filtered sample of Example 12 (25% water) where neither mineral spirits nor lecithin was employed, and over the filtered sample of Example 11 (19.5% water) where only mineral spirits and no lecithin was employed.

It was further found that agglomeration of coal char, particularly, as contrasted to coal, could not be achieved in acid or neutral solution using separately either a surfactant or a hydrocarbon. The process of the present invention accordingly offers an effective means to achieve agglomeration of those carbonaceous materials, especially coal char, which are difficult to agglomerate by other prior art techniques.

From the foregoing, it is seen that the invention provides a simple and efficient method for reducing the water content of certain solid carbonaceous materials, particularly coal char or coke breeze in an aqueous slurry thereof, to relatively low levels by the above noted procedure, including providing an acid slurry of such carbonaceous particles, adding the combination of a suitable surfactant and a suitable liquid hydrocarbon or related organic compound, to cause agglomeration, preferably followed by screening and filtration of the agglomerated solids. Drying of the agglomerated solids is also preferably carried out to effect recovery of the liquid hydrocarbon or other related liquid organic compound.

While particular embodiments of the invention have been described for purposes of illustration, it is understood that other modifications and variations will occur to those skilled in the art, and the invention accordingly is not to be taken as limited except by the scope of the appended claims.

What is claimed is:

1. A process for producing agglomerated solid carbonaceous material from an aqueous slurry of water and a solid carbonaceous material selected from the group consisting of coal char and coke breeze, comprising:
   (a) forming a mixture which comprises
      i. said aqueous slurry of said solid carbonaceous material and said water,
      ii. an acid, thereby forming an aqueous acid with said water of said aqueous slurry, the amount of said acid being between about 1 and about 35% by weight of said aqueous acid, iii. a surfactant, and iv. a liquid organic material selected from the group consisting of hydrocarbons, chlorinated hydrocarbons, low molecular weight aliphatic alcohols, and mixtures thereof, said liquid organic material being immiscible in said aqueous acid but miscible with said surfactant, the amounts of said acid, said surfactant and said liquid organic material being sufficient to cause agglomeration of said solid carbonaceous material and to displace a major portion of said water from said solid carbonaceous material;

(b) agglomerating said solid carbonaceous material; and (c) recovering said agglomerated solid carbonaceous material.

2. A process for producing agglomerated carbonaceous residue solids from the group consisting of coal char and coke breeze, comprising:

(a) mixing a first aqueous slurry of carbonaceous residue solids and water, with HCl, thereby forming a second aqueous slurry which comprises a mixture of said carbonaceous residue solids and aqueous hydrochloric acid, the amount of said HCl being between about 1 and about 35% by weight of said aqueous hydrochloric acid;

(b) adding to and mixing with said second aqueous slurry i. a surfactant selected from the group consisting of lecithin, tricapryl methyl ammonium chloride and a polyethoxylated secondary alcohol of $C_{11}$ to $C_{15}$ carbon chains, in an amount between about 0.1 and about 5 parts per 100 parts by weight of said carbonaceous residue solids, and ii. an organic material selected from the group consisting of mineral spirits, methylene chloride and pentane, in an amount between about 10 and about 75 l parts per 100 parts by weight of said carbonaceous residue solids, thereby forming a resultant mixture, the amounts of said HCl, said surfactant and said organic material being sufficient to cause agglomeration of said carbonaceous residue solids and to displace a major portion of said water from said carbonaceous residue solids;

(c) agglomerating said carbonaceous residue solids; and (d) recovering said agglomerated carbonaceous residue solids.

3. The process as defined in claim 2, wherein said surfactant is lecithin and said organic material is mineral spirits, said lecithin being employed in an amount from about 0.1 to about 2 parts, and said mineral spirits being employed in an amount from about 20 to about 70 parts per 100 parts by weight of said carbonaceous residue solids.

4. The process as defined in claim 3, said carbonaceous residue solids being coke breeze, said coke breeze being present in an amount ranging from about 2 to about 35%, by weight of said second aqueous slurry.

5. The process as defined in claim 2, said carbonaceous residue solids being coal char, said coal char being present in an amount ranging from about 2 to about 35%, by weight of said second aqueous slurry.

6. The process as defined in claim 5, wherein said surfactant is lecithin and said organic material is mineral spirits, said lecithin being employed in an amount from about 0.1 to about 2 parts, and said mineral spirits being employed in an amount from about 20 to about 70 parts per 100 parts by weight of said coal char.

7. The process as defined in claim 5, further comprising heating said second aqueous slurry to a temperature between about 60 and about 100° C., prior to adding said surfactant and said organic material thereto.

8. The process as defined in claim 5, said resultant mixture being maintained at about ambient temperature during step (c).

9. The process as defined in claim 2, wherein step (d) comprises screening and then filterng the agglomerated carbonaceous residue solids.

10. A process for producing agglomerated solid carbonaceous material from an aqueous slurry of water and a solid carbonaceous material selected from the group consisting of coal char and coke breeze comprising:

(a) forming a mixture which comprises i. said aqueous slurry of said solid carbonaceous material and said water, ii. an acid, thereby forming an aqueous acid with said water of said aqueous slurry, the amount of said acid being between about 1 and about 35% by weight of said aqueous acid, iii. a surfactant, the amount of said surfactant being between about 0.1 and about 5 parts by weight per 100 parts by weight of said solid carbonaceous material, and iv. a liquid organic material selected from the group consisting of hydrocarbons, chlorinated hydrocarbons, aliphatic alcohols, and mixtures thereof, said liquid organic material being immiscible in said aqueous acid but miscible with said surfactant, the amount of said liquid organic material being between about 10 and about 75 parts per 100 parts by weight of said solid carbonaceous material, and wherein the amounts of said acid, said surfactant and said liquid organic material being sufficient to cause agglomeration of said solid carbonaceous material;

(b) agglomerating said solid carbonaceous material; and (c) recovering said agglomerated solid carbonaceous material.

11. The process as defined in claim 10, said carbonaceous material having a particle size ranging from less than about 60 mesh to less than about 400 mesh.

12. The process as defined in claim 10, said acid being selected from the group consisting of hydrochloric, phosphoric, nitric, sulfuric and acetic acids.

13. The process as defined in claim 12, said acid being HCl.

14. The process as defined in claim 10, said surfactant being water immiscible or water miscible.

15. The process as defined in claim 10, said surfactant being selected from the group consisting of nonionic, amphoteric and cationic surfactants.

16. The process as defined in claim 15, said surfactant being lecithin.

17. The process as defined in claim 16, employing about 0.1 to about 5% lecithin by weight of said solid carbonaceous material.

18. The process as defined in claim 17, said liquid organic material being mineral spirits, and employing about 10 to about 75% mineral spirits by weight of said solid carbonaceous material.

19. The process as defined in claim 18, said solid carbonaceous material being coal char.

20. The process as defined in claim 18, said solid carbonaceous material being coke breeze.

21. The process as defined in claim 10, said organic material being a liquid hydrocarbon.

22. The process as defined in claim 21, said liquid hydrocarbon being an aliphatic hydrocarbon containing from about 5 to about 12 carbon atoms.

23. The process as defined in claim 21, said liquid hydrocarbon being a petroleum fraction selected from the group consisting of a distillate and a distillate residue fraction.

24. The process as defined in claim 10, said organic material being a liquid chlorinated hydrocarbon containing about 1 to about 12 carbon atoms.

25. The process as defined in claim 10, said liquid organic material being a low molecular weight liquid aliphatic alcohol containing from about 5 to about 10 carbon atoms.

26. The process as defined in claim 10, said liquid organic material being an aromatic liquid hydrocarbon containing from about 6 to about 10 carbon atoms.

27. The process as defined in claim 10, said liquid organic material being mineral spirits.

28. The process as defined in claim 27, employing about 10 to about 75% mineral spirits, by weight of said solid carbonaceous material.

29. The process as defined in claim 10, wherein said forming of said aqueous acid is prior to said forming of said mixture, and further comprising heating the aqueous acid slurry to an elevated temperature prior to the addition of said surfactant and said liquid organic material.

30. The process as defined in claim 29, said acid being HCl, and said elevated temperature ranging from about 60° to about 100° C.

31. The process as defined in claim 10, wherein said mixture is maintained at ambient temperature.

32. The process as defined in claim 10, wherein step (c) comprises the steps of screening and filtering said agglomerated solid carbonaceous material.

33. The process as defined in claim 32, further comprising drying said filtered agglomerated solid carbonaceous material and recovering said liquid organic material.

34. A process for producing agglomerated carbonaceous residue solids from an aqueous slurry of carbonaceous residue solids selected from the group consisting of coal char and coke breeze, comprising:
  (a) mixing a first aqueous slurry of carbonaceous residue solids and water, with hydrochloric acid, thereby forming a second aqueous slurry which comprises said carbonaceous residue solids and aqueous hydrochloric acid, the amount of said hydrochloric acid being between about 1 and about 35% by weight of said aqueous hydrochloric acid, said carbonaceous residue solids being present in an amount between about 2 and about 35% by weight of said second aqueous slurry;
  (b) adding to and mixing with said second aqueous slurry
    i. a surfactant selected from the group consisting of lecithin, tricapryl methyl ammonium chloride and a polyethoxylated secondary alcohol of $C_{11}$ to $C_{15}$ carbon chains, in an amount between about 0.1 and about 2 parts per 100 parts by weight of said carbonaceous residue solids,
    ii. an organic material selected from the group consisting of mineral spirits, methylene chloride and pentane, in an amount between about 20 and about 70 parts per 100 parts by weight of said carbonaceous residue solids, and
  wherein the amounts of said hydrochloric acid, said surfactant and said organic material being sufficient to cause agglomeration of said solid carbonaceous material;
  (c) agglomerating said carbonaceous residue solids; and
  (d) separating and recovering said agglomerated carbonaceous residue solids by
    i. screening said agglomerated carbonaceous residue solids,
    ii. filtering the screened agglomerated carbonaceous residue solids, and
    iii. drying the filtered and screened agglomerated carbonaceous residue solids.

* * * * *